US012441587B2

(12) United States Patent
Nikander et al.

(10) Patent No.: US 12,441,587 B2
(45) Date of Patent: Oct. 14, 2025

(54) METHOD AND SYSTEM FOR AN AUTOMATIC RESCUE OPERATION OF AN ELEVATOR CAR

(71) Applicant: KONE Corporation, Helsinki (FI)

(72) Inventors: Juhamatti Nikander, Helsinki (FI); Janne Salomäki, Helsinki (FI)

(73) Assignee: KONE Corporation, Helsinki (FI)

( * ) Notice: Subject to any disclaimer, the term of this patent is extended or adjusted under 35 U.S.C. 154(b) by 1101 days.

(21) Appl. No.: 17/398,559

(22) Filed: Aug. 10, 2021

(65) Prior Publication Data

US 2022/0048735 A1 Feb. 17, 2022

(30) Foreign Application Priority Data

Aug. 11, 2020 (EP) .................................... 20190488

(51) Int. Cl.

*B66B 5/02* (2006.01)
*B66B 1/34* (2006.01)
*B66B 1/42* (2006.01)
*B66B 5/16* (2006.01)

(52) U.S. Cl.

CPC ............ *B66B 5/027* (2013.01); *B66B 1/3453* (2013.01); *B66B 1/3476* (2013.01); *B66B 1/42* (2013.01); *B66B 5/16* (2013.01)

(58) Field of Classification Search

CPC ........... B66B 5/027; B66B 5/02; B66B 5/028; B66B 1/3476

See application file for complete search history.

(56) References Cited

U.S. PATENT DOCUMENTS 4,506,766 A * 3/1985 Watanabe ............... B66B 5/027 307/64
4,642,474 A * 2/1987 Watanabe ............... H02J 9/062 307/64
6,315,081 B1 * 11/2001 Yeo ......................... B66B 1/285 187/293
6,435,312 B2 * 8/2002 Tajima .................... B66B 1/285 187/296
8,230,978 B2 * 7/2012 Agirman ................. B66B 1/302 187/296
8,631,908 B2 * 1/2014 Schroeder-Brumloop .................. B66B 1/30 187/290

(Continued)

FOREIGN PATENT DOCUMENTS

EP 2 448 854 B1 8/2017
EP 2 269 297 B1 5/2018
EP 3 210 922 B1 8/2019

OTHER PUBLICATIONS

Search Report issued in European priority application 20190488.5, dated Feb. 8, 2021.

*Primary Examiner* — Michael A Riegelman
(74) *Attorney, Agent, or Firm* — Birch, Stewart, Kolasch & Birch, LLP

(57) ABSTRACT

In a system and method for an automatic rescue operation of an elevator car in an elevator system, the elevator system includes a hoisting machine and a battery-operated rescue drive device configured to provide power signals to the hoisting machine and/or hoisting machinery brakes. A load sensor is configured to gather elevator car load information, and the rescue drive device is configured to select, based on the elevator car load information, a first rescue run or a second rescue run.

20 Claims, 3 Drawing Sheets

(56) References Cited

U.S. PATENT DOCUMENTS

| | | | | |
|---|---|---|---|---|
| 8,960,371 | B2 * | 2/2015 | Schoenauer | B66B 5/027 187/290 |
| 9,381,990 | B2 * | 7/2016 | Settemsdal | B60L 7/16 |
| 9,758,342 | B2 | 9/2017 | Stolt et al. | |
| 10,189,676 | B2 * | 1/2019 | Hovi | B66B 1/06 |
| 10,273,116 | B2 * | 4/2019 | Kattainen | B66B 5/027 |
| 10,723,589 | B2 * | 7/2020 | Nikander | B66B 5/027 |
| 11,114,887 | B2 * | 9/2021 | Saarela | B66B 5/027 |
| 11,897,725 | B2 * | 2/2024 | Millett | B66B 1/32 |
| 2002/0162705 | A1 * | 11/2002 | Shadkin | B66B 5/02 187/290 |
| 2007/0261924 | A1 * | 11/2007 | Lindberg | B66B 5/027 187/391 |
| 2007/0272492 | A1 * | 11/2007 | Tegtmeier | B66B 5/027 187/290 |
| 2008/0202859 | A1 * | 8/2008 | Tegtmeier | B66B 5/027 187/288 |
| 2011/0144810 | A1 * | 6/2011 | Wesson | B66B 1/302 700/275 |
| 2012/0085593 | A1 * | 4/2012 | Schoenauer | B66B 5/027 187/254 |
| 2018/0134519 | A1 * | 5/2018 | Kattainen | B66B 1/32 |
| 2018/0215576 | A1 * | 8/2018 | Wei | F16D 5/00 |
| 2019/0330014 | A1 * | 10/2019 | Kattainen | B66B 19/00 |
| 2021/0123976 | A1 * | 4/2021 | Vuorio | B66B 5/0037 |
| 2021/0395041 | A1 * | 12/2021 | Jussila | B66B 9/00 |
| 2022/0048735 | A1 * | 2/2022 | Nikander | B66B 1/3476 |
| 2022/0128606 | A1 * | 4/2022 | Vuorio | B66B 5/0031 |
| 2024/0286869 | A1 * | 8/2024 | Talonen | B66B 5/0031 |

* cited by examiner

METHOD AND SYSTEM FOR AN AUTOMATIC RESCUE OPERATION OF AN ELEVATOR CAR

FIELD OF THE INVENTION

The present invention relates to a method and system for an automatic rescue operation of an elevator car in an elevator system, wherein the method and system aim to draw a limited amount of power from a battery while maintaining ride-comfort requirements.

BACKGROUND OF THE INVENTION

An elevator automatic rescue operation is typically used if an elevator car has stopped between floors during a supply outage using a battery-operated rescue device to provide power to the elevator from batteries.

Traditionally, a field technician goes to the elevator site and opens hoisting machinery brakes with a manual brake lever, allowing drifting of the elevator car to a landing by means of gravity. This solution works only in the case of an unbalanced elevator car load. In case of a balanced car load, a separate hoist such as a tirak is additionally needed for moving the elevator car. This kind of rescue operation is thus slow and labor-intensive.

Therefore, solutions for an automatic rescue operation have been developed. A conventional solution is to move the elevator car to the next available landing using a correction run profile. The drive system may have lost motor synchronization due to the supply outage.

Therefore, the control system has to re-synchronize an electric motor of a hoisting machine before movement. This synchronization procedure draws power from a battery. Subsequently, pre-torque is applied to the electric motor of the hoisting machine based on elevator car load-weighing information before machinery brakes are opened.

Said electric motor draws a considerable amount of power when it attempts to prevent the elevator car from moving in an unbalanced load condition during the starting phase. The same high-power peak occurs when the elevator car is stopped exactly to the destination floor level at a very low velocity. During a constant velocity phase of the rescue run, an elevator unbalance provides power to the motor and machinery brakes as the electric motor acts as a generator.

EP 2 448 854 B1 describes a gravity driven start phase in a power limited elevator rescue operation. Specifically, when a main power to an elevator system is lost, an automatic operation is performed using power from a backup power source. A rescue run for an elevator stopped between floors is initiated by lifting a brake and allowing the elevator car to move by gravity. If the car moves as a result of a weight imbalance between the car and a counterweight, an operation of the hoist motor is synchronized with sensed movement of the car to generate electricity. If weight is balanced so that the car does not move, backup power is supplied to the hoist motor to apply a motor torque to drive the car in a selected direction during the rescue run.

EP 3 210 922 B1 discloses an elevator run profile modification for smooth rescue. Said method includes powering, using a battery, the elevator system when an external power source is unavailable. The method further includes determining, using a controller, a run profile of the elevator car in response to a selected deceleration. The method additionally includes operating, using the controller, the elevator car in response to the run profile determined, and determining, using the controller, an actual velocity of the elevator car. A problem with these solutions is that during a starting procedure of the elevator car, large amounts of power are drawn from a battery device.

Dimensioning and cost of the rescue drive device depends largely on a power rating and an available battery capacity. Up until now, the high associated cost and/or large size of the rescue drive device has reduced its use in high-volume elevators.

AIM OF THE INVENTION

It is thus an object of the present invention to provide a method and system for an automatic rescue operation of an elevator car in an elevator system that is capable of moving an elevator car with reduced power requirements compared to conventional systems. At the same time, a rescue operation of the elevator car comprising a smooth run profile is desirable.

By means of the inventive solution, it is possible to use a smaller, less powerful and/or cheaper elevator rescue drive device. Alternatively, a normal elevator drive unit such as a frequency converter with an integrated battery can be used as a rescue drive device outside normal elevator operation.

SUMMARY OF THE INVENTION

To solve the above-mentioned object, the present invention provides a method for an automatic rescue operation of an elevator car in an elevator system, said elevator system further comprising a hoisting machine and a battery-operated rescue drive device providing power signals to the hoisting machine and/or hoisting machinery brakes.

The method comprises the steps of gathering, by a load sensor, elevator car load information. The method further comprises the step of selecting based on the elevator car load information, by the rescue drive device, a first rescue run or a second rescue run, wherein said first rescue run comprises supplying electrical power from a battery of the rescue drive device to an electric motor of the hoisting machine and/or hoisting machinery brakes to initiate movement of the elevator car.

Said second rescue run comprises shorting windings of the electric motor of the hoisting machine to apply dynamic braking of the electric motor, wherein the first rescue run is selected if the elevator car load is within a first range of a rated load of the elevator car, and wherein the second rescue run is selected if the elevator car load is within a second range of the rated load of the elevator car.

Furthermore, the present invention provides a system for an automatic rescue operation of an elevator car in an elevator system, said elevator system further comprising a hoisting machine and a battery-operated rescue drive device configured to provide power signals to the hoisting machine and/or hoisting machinery brakes, wherein a load sensor is configured to gather elevator car load information, and the rescue drive device is configured to select, based on the elevator car load information, a first rescue run or a second rescue run.

Said first rescue run comprises supplying electrical power from a battery of the rescue drive device to an electric motor of the hoisting machine and/or hoisting machinery brakes to initiate movement of the elevator car, and wherein said second rescue run comprises shorting windings of the electric motor of the hoisting machine to apply dynamic braking of the electric motor.

The battery-operated rescue drive device is further configured to select the first rescue run if the elevator car load is within a first range of a rated load of the elevator car, and wherein the battery-operated rescue drive device is configured to select the second rescue run if the elevator car load is within a second range of the rated load of the elevator car.

By providing a first rescue run and a second rescue run which are selected based on the gathered elevator car load information being in a predetermined range respectively, battery power of the battery-operated rescue drive device is only requested under the specified conditions.

According to the further aspect of the invention, the first rescue run is selected if the elevator car load is within 25% to 75% of the rated load of the elevator car, and wherein the second rescue run is selected if the elevator car load is within 0% to 25% or 75% to 100% of the rated load of the elevator car.

In case when the elevator car load is within 25% to 75% of the rated load of the elevator car, the elevator car is thus in a substantially balanced condition thus requiring electric motor support to move.

By contrast, when the elevator car load is within 0% to 25% or 75% to 100%, the elevator car is in a substantially unbalanced condition meaning that it can start moving on its own due to gravity once the hoisting machinery brakes are opened.

According to a further aspect of the invention, at the beginning of the first rescue run, electrical power is supplied from the battery to resolve a rotor pole position of the electric motor of the hoisting machine, and wherein power signals are provided to the electric motor of the hoisting machine in order to generate pre-torque before the hoisting machinery brakes are opened. Preferably, the rotor pole position is resolved as disclosed in EP2269297B1, by supplying from the battery to the windings of the electric motor a first and a second rotating voltage or current excitation signal, which are fitted to be of opposite directions in their direction of rotation, determining first and second current or voltage response signals respectively, and determining the rotor pole position, i.e. the position of rotor of electric machine in EP2269297B1, from said response signals.

Said pre-torque is a torque generated by the electric motor of the hoisting machine in an amount capable of compensating the elevator car load when the hoisting machinery brakes are open such that the elevator car does not move on its own due to gravity before the electric motor provides sufficient torque.

According to a further aspect of the invention, the hoisting machinery brakes are opened by supplying power, in particular pick power, from the battery to the brakes one-by-one, wherein after opening a brake, a power supply to the brake is reduced to a predefined level required to hold the brake open.

The term Pick power refers to the level of power required for picking, i.e. opening of the hoisting machinery brakes, wherein the pick power is higher than the power required for keeping the brakes open after they have been picked.

This way, the pick power supplied from the battery can be reduced due to the fact that only one brake at a time needs to be supplied with pick power instead of several or all of the brakes.

According to a further aspect of the invention, during the first rescue run, after opening the hoisting machinery brakes, electrical power is supplied from the battery to the electric motor of the hoisting machine and to the brakes to drive the elevator car towards a landing. Thus, the elevator car can be driven to the landing by means of the rescue drive device in accordance with a preselected rescue run motion profile. This way, the elevator car will stop accurately to the landing and passengers can exit safely the elevator car.

According to a further aspect of the invention, in the second rescue run, movement of the elevator car is initiated by activating motor dynamic braking, wherein all motor phases are connected together (i.e. shorted) using motor inverter power transistors, and subsequently the hoisting machinery brakes are opened one-by-one. After the hoisting machinery brakes have been opened, the elevator car thus starts to move by gravity because of the significant unbalance.

To reduce car accelerations, windings of the hoisting motor are thus shorted to apply dynamic braking to the hoisting motor. The shorting of the windings causes current in the windings of a moving hoisting motor, which current causes a braking torque. A rotor pole position of the hoisting motor is resolved from operating parameters such as current, voltages and/or inductance of the hoisting motor when the windings are shorted and the hoisting motor is rotating. Preferably, the rotor pole position is resolved by using a mathematic model. The mathematical model may be same as in equation (3) of U.S. Pat. No. 9,758,342B2.

According to a further aspect of the invention, in a first mode of the second rescue run, dynamic braking is enabled, a measured speed of the electric motor of the hoisting machine is less than a threshold speed and a velocity control of the elevator car is disabled, wherein a velocity of the elevator car increases until a dynamic braking torque of the electric motor of the hoisting machine meets a load torque from which point forward the velocity will be substantially constant.

Thus, the elevator car can advantageously be controlled to travel at a predetermined substantially constant velocity. In addition, motor torque is zero or opposite to the traveling direction of the elevator car such that the electric motor is braking the elevator car by regenerating electrical energy.

According to a further aspect of the invention, in a second mode of the second rescue run, dynamic braking is disabled, a measured speed of the electric motor of the hoisting machine is less than a threshold speed, velocity control of the elevator car is enabled, and a velocity reference is set equal to a measured velocity of the elevator car.

Furthermore, if needed, acceleration can be limited by limiting the rate of change of the velocity reference. In addition, motor torque is zero or opposite to the traveling direction of the elevator car such that the electric motor is braking the elevator car by regenerating electrical energy.

According to a further aspect of the invention, in a third mode of the second rescue run, a measured speed of the electric motor of the hoisting machine is equal to or higher than a threshold speed, velocity control of the elevator car is enabled and a velocity reference is set so that acceleration of the elevator car is continuous and rate-limited, wherein a final velocity of the elevator car is a desired rescue velocity.

The motor torque of the electric motor is opposite to the traveling direction of the elevator car. Thus, the electric motor is braking the elevator car by regenerating electrical energy.

According to a further aspect of the invention, if an elevator positioning system indicates that a position of the elevator car is at an edge of a door zone area, power is drawn from the battery to generate braking torque in the electric motor of the hoisting machine. To avoid drawing excessive current from the battery during the deceleration phase, motor torque reference or motor current reference can be limited to the same value the motor torque reference or motor current reference is at the time if the measured battery current or the measured battery power exceeds the defined battery current limit or battery power limit.

According to a further aspect of the invention, in the second rescue run, to reduce an acceleration of the elevator car after the hoisting machinery brakes are open, windings of the electric motor of the hoisting machine are shorted to apply dynamic braking to the electric motor of the hoisting machine. The reduced power rescue run comprises resolving a rotor pole position of the hoisting motor from operating parameters of a rotating hoisting motor during the dynamic breaking. The terms hoisting motor and electric motor of the hoisting machine are considered synonymous.

According to a further aspect of the invention, the rescue drive device determines a velocity of the elevator car by means of a motor encoder, and starts regenerative braking by initiating modulation of power transistors of an inverter of the electric motor of the hoisting machine when the velocity of the elevator car exceeds a predetermined threshold value. Naturally, dynamic braking stops when the regenerative braking starts.

According to a further aspect of the invention, for a period of the regenerative braking of the electric motor of the hoisting machine, the rescue drive device operates a speed control loop of the elevator car such that movement of the elevator car proceeds according to a predetermined speed profile towards a landing.

If the elevator car does not start to move within a certain time window set from the brakes being opened in the second rescue run, or if the elevator car velocity otherwise deviates from a desired velocity during the reduced-power rescue run such that the elevator car will not reach a landing, the rescue run device will generate a service call to a remote service center to get the operational anomaly solved and/or to get the passengers rescued from the car.

According to a further aspect of the invention, at the end of the second rescue run, a distance of the elevator car to a landing is measured, wherein a brake dropping command is generated when the measured distance is less than a predetermined brake dropping limit.

The brake dropping limit is selected such that the brake is activated in time to enable stopping of the car to the landing as accurately as possible. Thus, at least the following parameters are taken into account when calculating the braking dropping limit: A brake dropping delay, a car speed at the brake dropping situation and a braking distance.

According to a further aspect of the invention, in the second rescue run, a rotor pole position of the electric motor of the hoisting machine is resolved from operating parameters of the rotating electric motor during the dynamic braking of the electric motor. Hence, The herein described features of the method for an automatic rescue operation of an elevator car in an elevator system are also disclosed for the system for the automatic rescue operation of the elevator car in the elevator system and vice versa.

For a more complete understanding of the present invention and advantages thereof, reference is now made to the following description taken in conjunction with the accompanying drawings. The invention is explained in more detail below using exemplary embodiments, which are specified in the schematic figures of the drawings, in which.

Unless indicated otherwise, like reference numbers or signs to the figures indicate like elements.

Figure 1:
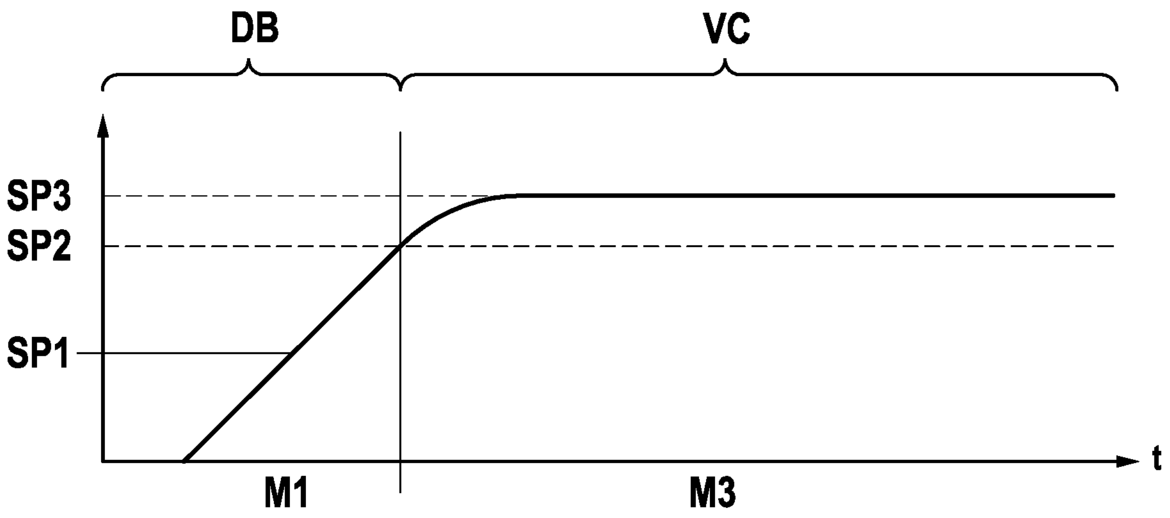
FIG. 1 shows a graph of an elevator speed profile during an automatic rescue operation according to an embodiment of the invention.

FIG. 1 shows an example embodiment of an elevator speed profile during an automatic rescue operation when the elevator car load is lower than 25% or higher than 75% of a rated load of the elevator car. The figure shows a situation where the speed of the electric motor 12*a* of the hoisting machine 12 reaches a threshold speed SP2 during dynamic braking.

In the first mode M1 of a second rescue run, dynamic braking DB is enabled, a measured speed SP1 of the electric motor 12*a* of the hoisting machine 12 is less than a threshold speed SP2 and a velocity control VC of the elevator car 10 is disabled.

A velocity CV of the elevator car 10 increases until a dynamic braking torque of the electric motor 12*a* of the hoisting machine 12 meets a load torque such that a constant velocity CV is reached.

In a third phase M3 of the second rescue run R2, a measured speed SP1 of the electric motor 12*a* of the hoisting machine 12 is equal to or higher than the threshold speed SP2, velocity control VC of the elevator car 10 is enabled and a velocity reference is set so that acceleration of the elevator car 10 is continuous and rate-limited, wherein a final velocity of the elevator car 10 is a desired rescue velocity CV.

Figure 2:
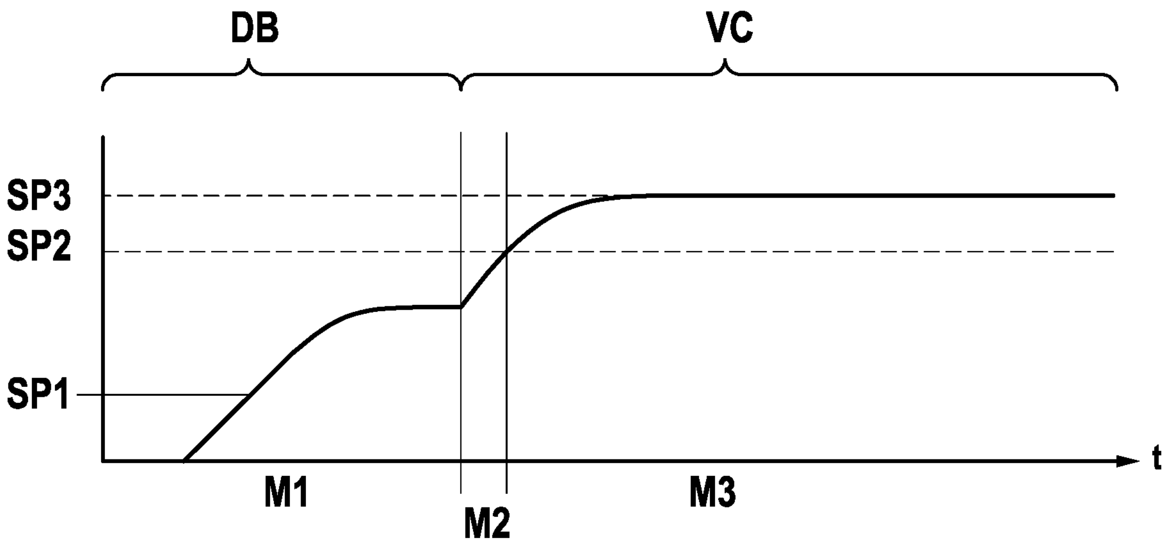
FIG. 2 shows a graph of an elevator speed profile during the automatic rescue operation according to the embodiment of the invention.

FIG. 2 shows a situation where the motor speed is saturated due to the dynamic braking. Dynamic braking is enabled and the measured motor speed is under the threshold speed SP2. In this mode, speed control is disabled. The elevator velocity accelerates due to gravity.

The velocity of the elevator car 10 increases until motor dynamic braking torque meets the load torque such that constant speed is reached. Motor torque is zero or opposite to the traveling direction such that the elevator car 10 is braked by the electric motor of the hoisting machine by its own regenerating electrical energy.

The depicted mode 2 is then subsequently used. Dynamic braking is disabled and the measured motor speed SP1 is under the threshold value SP2. The elevator accelerates due to gravity. In this mode, speed control is enabled and speed reference is set equal to the measured speed SP1.

Subsequently, the third mode M3 is used if the motor speed SP1 is equal to or higher than the threshold speed SP2. Speed control is enabled and the speed reference is formed so that acceleration is continuous and rate-limited and a final speed is the desired rescue speed SP3. Motor torque is opposite to the traveling direction, i.e. the elevator car is braked by the electric motor of the hoisting machine by regenerating electrical energy.

Figure 3:
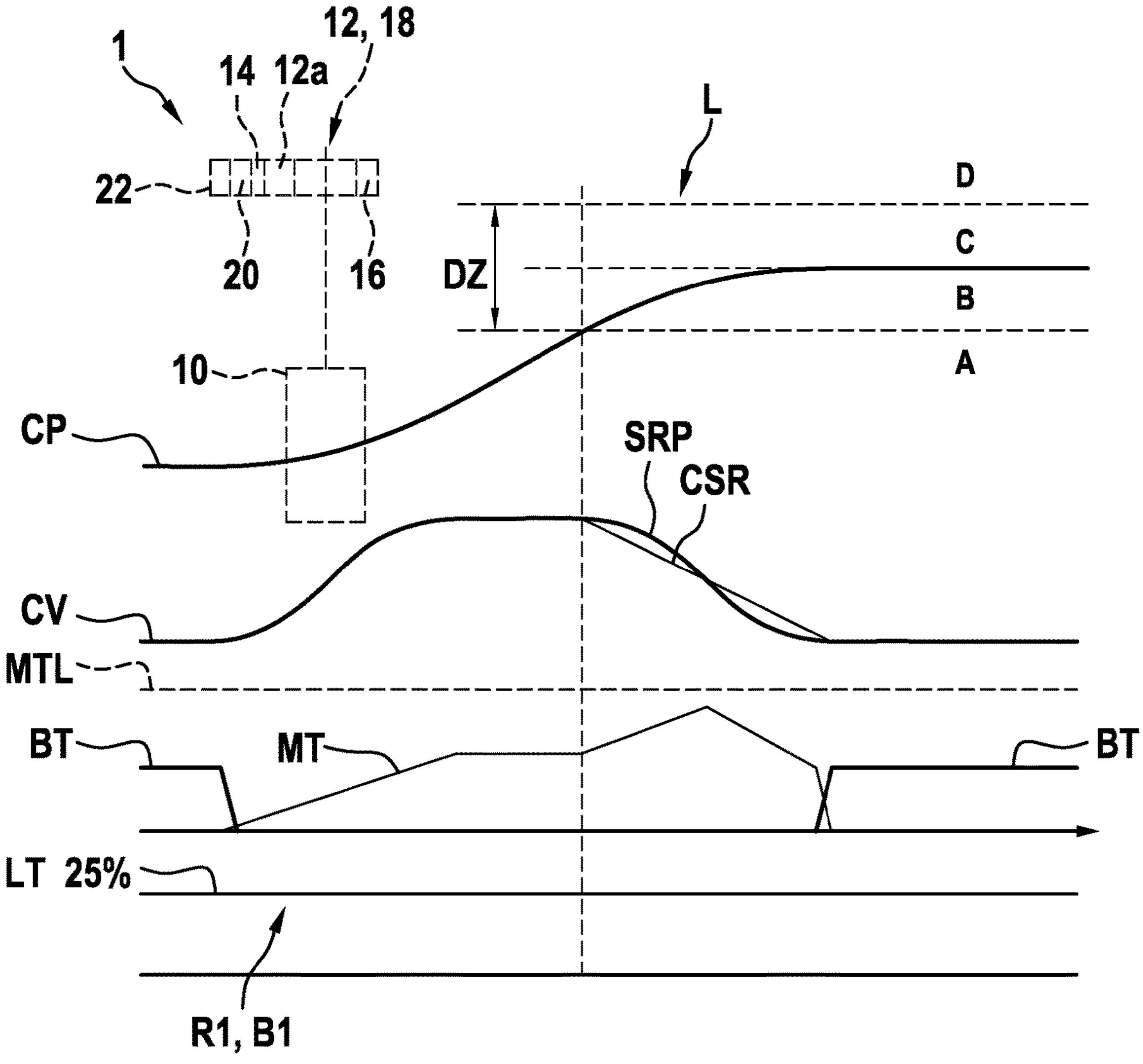
FIG. 3 shows a graph of a car position, a car velocity, a brake torque and a motor torque at an elevator load torque of 25% according to the embodiment of the invention.

FIG. 3 shows a graph of a car position, a car velocity, a brake torque and a motor torque at an elevator load torque of 25% according to the embodiment of the invention The system and method for an automatic rescue operation of an elevator car 10 in an elevator system 1 is depicted. Said elevator system 1 further comprises a hoisting machine 12 and a battery-operated rescue drive device 14 providing power signals to the hoisting machine 12 and/or hoisting machinery brakes 16. The method comprises gathering, by a load sensor 18, elevator car load information. Furthermore, the method comprises selecting based on the elevator car load information, by the rescue drive device 14, a first rescue run R1 or a second rescue run R2.

Said first rescue run R1 comprises supplying electrical power from a battery 20 of the rescue drive device 14 to an electric motor 12*a* of the hoisting machine 12 and/or hoisting machinery brakes 16 to initiate movement of the elevator car 10.

Said second rescue run R2 comprises shorting windings of the electric motor 12 of the hoisting machine to apply dynamic braking DB of the electric motor 12, wherein the first rescue run R1 is selected if the elevator car load is within a first range B1 of a rated load of the elevator car. The second rescue run R2 is selected if the elevator car load is within a second range B2 of the rated load of the elevator car.

In addition, the first rescue run R1 is selected if the elevator car load is within 25% to 75% of the rated load of the elevator car 10. The second rescue run R2 is selected if the elevator car load is within 0% to 25% or 75% to 100% of the rated load of the elevator car. The rated load is understood to be the full load of the elevator car. However, those ranges are only exemplary and may vary based on a balancing ratio of the elevator car, i.e. whether a counterweight is dimensioned to 50% of the weight of a full load plus the elevator car or alternatively, for example, to 40%.

At the beginning of the first rescue run R1, electrical power is supplied from the battery 20 to resolve a rotor pole position of the electric motor 12*a* of the hoisting machine 12. Subsequently, power signals are provided to the electric motor 12*a* of the hoisting machine 12 in order to generate a pre-torque before the hoisting machinery brakes 16 are opened. The hoisting machinery brakes 16 are opened by supplying power, in particular pick power, from the battery 20 to the brakes one-by-one. After opening a brake, a power supply to the brake is reduced to a predefined level required to hold the brake open. At first pick power is supplied to the first brake and consequently to the second brake after power supply to the first brake has been reduced to the limit for holding the first brake open. This way momentary net power required by the brakes can be reduced.

During the first rescue R1, after opening the hoisting machinery brakes 16, electrical power is supplied from the battery 20 to the electric motor 12*a* of the hoisting machine 12 and to the brakes to drive the elevator car 10 towards a landing L. The car position CP of the elevator car moves from a starting position to a door zone DZ, said door zone being indicated by the letters A, B, C and D.

When an elevator positioning system 22 indicates that the elevator car position is at the edge of the door zone DZ area and the elevator car 10 has to be stopped to reach the destination floor level, power is drawn from the battery 20 since the electric motor 12*a* no longer acts as a generator when motor torque begins to decelerate the elevator car.

To avoid drawing excessive current from the battery during the deceleration phase, motor torque reference or motor current reference is limited to the same value the motor torque reference or motor current reference is at the time if the measured battery current or the measured battery power exceeds the defined battery current limit or battery power limit. The car velocity CV of the elevator car 10 follows a smooth run profile SRP. Alternatively, the elevator car can be controlled according to a ramp stop CSR or alternatively, by means of machinery brakes.

In addition, the blending of brake torque BT and motor torque MT is shown with respect to the car position CP and the car velocity CV of the elevator car 10, wherein a motor torque limit MTL is due to a battery current limitation. Motor torque and current may be limited during the deceleration phase to avoid exceeding battery current limits.

Figure 4:
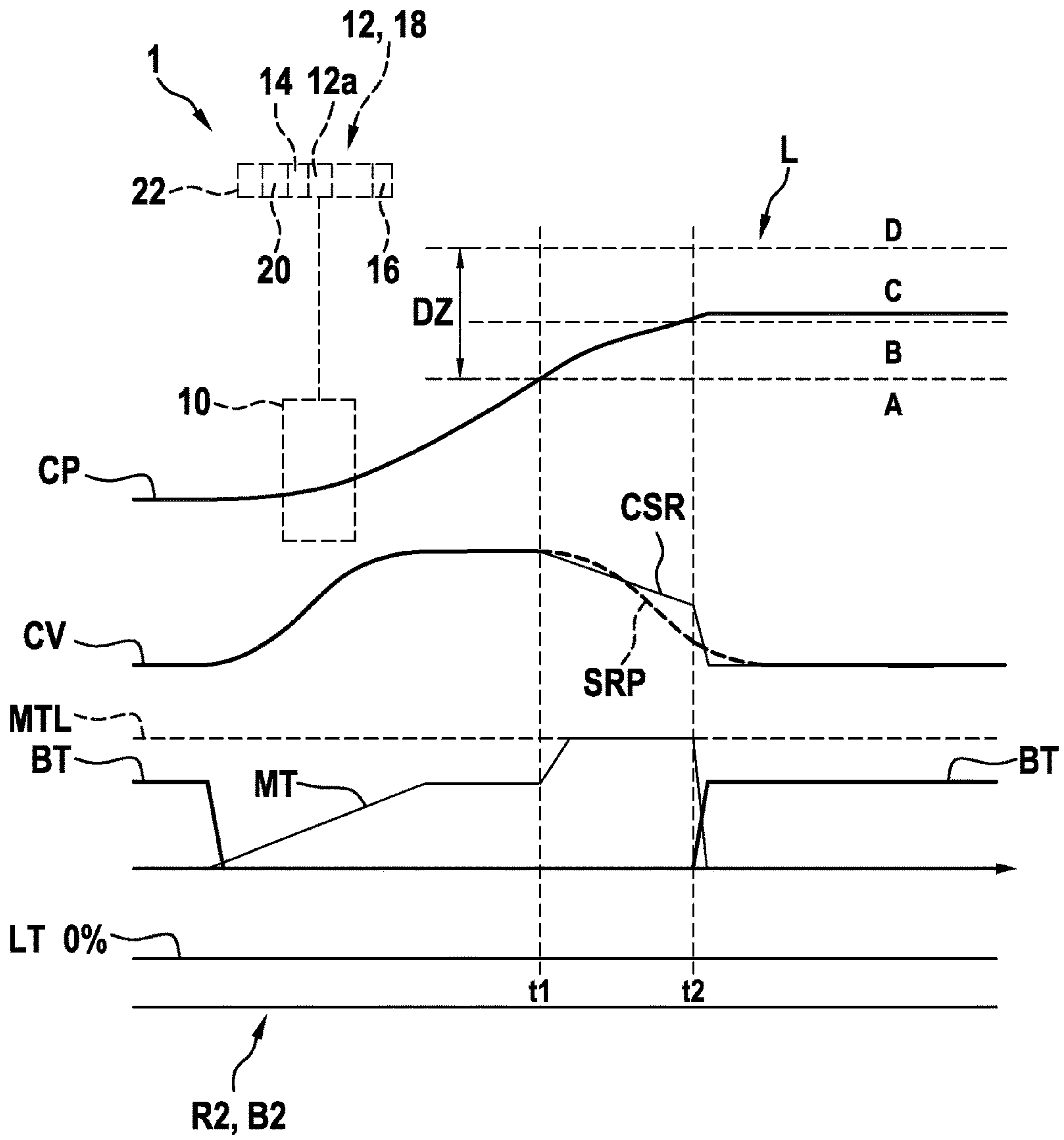
FIG. 4 shows a graph of the car position, the car velocity, the brake torque and the motor torque at an elevator load torque of 0% according to the embodiment of the invention.

FIG. 4 shows a graph of the car position, the car velocity, the brake torque and the motor torque at an elevator load torque of 0% according to the embodiment of the invention.

Motor torque is limited during the deceleration phase of the automatic rescue run due to battery current limitation or a battery power limitation. The brake torque is equal and opposite to the elevator load torque at the start and stop when the elevator car 10 is not moving. Stopping procedures are started when the elevator car positioning system 22 indicates that the elevator car 10 is at the edge of the door zone DZ.

Stopping is started either with a smooth run profile SRP at t1 but actual speed follows the curve CSR since motor torque becomes limited. In this example, machinery brakes are dropped at t2 when the elevator car position overshoots the exact floor level at the boundary between regions B and C.

In the second rescue run R2, movement of the elevator car 10 is initiated by activating motor dynamic braking DB. All motor phases are connected together using motor inverter power transistors, and subsequently the hoisting machinery brakes 16 are opened one-by-one.

If the elevator positioning system 22 indicates that the position of the elevator car 10 is at the edge of the door zone DZ area, power is drawn from the battery 20 to generate torque in the electric motor 12*a* of the hoisting machine 12.

To reduce an acceleration of the elevator car 10 after the hoisting machinery brakes 16 are open, windings of the electric motor 12*a* of the hoisting machine 12 are shorted to apply dynamic braking DB to the electric motor 12*a* of the hoisting machine 12.

The rescue drive device 14 determines a velocity of the elevator car 10 by means of a motor encoder, and starts regenerative braking by initiating modulation of power transistors of an inverter of the electric motor 12*a* when the velocity of the elevator car 10 exceeds a predetermined threshold value.

For a period of the regenerative braking of the electric motor 12*a*, the rescue drive device 14 operates a speed control loop of the elevator car 10 such that movement of the elevator car 10 proceeds according to the predetermined speed profile, i.e. SRP or CSR, towards the landing L.

According to an embodiment, at the end of the second rescue run R2, a distance of the elevator car 10 to the landing L is measured, wherein a brake dropping command is generated when the measured distance is less than a predetermined brake dropping limit.

The invention claimed is:

1. A method for an automatic rescue operation of an elevator car in an elevator system, said elevator system comprising a hoisting machine and a battery-operated rescue drive device providing power signals to the hoisting machine and/or hoisting machinery brakes, the method comprising the steps of:

gathering, by a load sensor, elevator car load information; and selecting based on the elevator car load information, by the rescue drive device, a first rescue run or a second rescue run, wherein said first rescue run comprises supplying electrical power from a battery of the rescue drive device to an electric motor of the hoisting machine and/or hoisting machinery brakes to initiate movement of the elevator car, wherein said second rescue run comprises shorting windings of the electric motor of the hoisting machine to apply dynamic braking of the electric motor, wherein the first rescue run is selected if the elevator car load is within a first range of a rated load of the elevator car, and wherein the second rescue run is selected if the elevator car load is within a second range of the rated load of the elevator car.

2. The method according to claim 1, wherein the first rescue run is selected if the elevator car load is within 25% to 75% of the rated load of the elevator car, and wherein the second rescue run is selected if the elevator car load is within 0% to 25% or 75% to 100% of the rated load of the elevator car.

3. The method according to claim 2, wherein at the beginning of the first rescue run, electrical power is supplied from the battery to resolve a rotor pole position of the electric motor of the hoisting machine, and wherein power signals are provided to the electric motor of the hoisting machine in order to generate pre-torque before the hoisting machinery brakes are opened.

4. The method according to claim 2, wherein the hoisting machinery brakes are opened by supplying power from the battery to the brakes one-by-one, and wherein after opening a brake, a power supply to the brake is reduced to a predefined level required to hold the brake open.

5. The method according to claim 1, wherein at the beginning of the first rescue run, electrical power is supplied from the battery to resolve a rotor pole position of the electric motor of the hoisting machine, and wherein power signals are provided to the electric motor of the hoisting machine in order to generate pre-torque before the hoisting machinery brakes are opened.

6. The method according to claim 5, wherein during the first rescue run, after opening the hoisting machinery brakes, electrical power is supplied from the battery to the electric motor of the hoisting machine and to the brakes to drive the elevator car towards a landing.

7. The method according to claim 5, wherein the hoisting machinery brakes are opened by supplying power from the battery to the brakes one-by-one, and wherein after opening a brake, a power supply to the brake is reduced to a predefined level required to hold the brake open.

8. The method according to claim 1, wherein the hoisting machinery brakes are opened by supplying, power from the battery to the brakes one-by-one, and wherein after opening a brake, a power supply to the brake is reduced to a predefined level required to hold the brake open.

9. The method according to claim 1, wherein in the second rescue run, movement of the elevator car is initiated by activating motor dynamic braking, and wherein all motor phases are connected together using motor inverter power transistors, and subsequently the hoisting machinery brakes are opened one-by-one.

10. The method according to claim 9, wherein in a first mode of the second rescue run, dynamic braking is enabled, a measured speed of the electric motor of the hoisting machine is less than a threshold speed and a velocity control of the elevator car is disabled, and wherein a velocity of the elevator car increases until a dynamic braking torque of the electric motor of the hoisting machine meets a load torque such that a constant velocity is reached.

11. The method according to claim 9, wherein in a second mode of the second rescue run, dynamic braking is disabled, a measured speed of the electric motor of the hoisting machine is less than a threshold speed, velocity control of the elevator car is enabled, and a velocity reference is set equal to a measured velocity of the elevator car.

12. The method according to claim 9, wherein in a third mode of the second rescue run, a measured speed of the electric motor of the hoisting machine is equal to or higher than a threshold speed, velocity control of the elevator car is enabled and a velocity reference is set so that acceleration of the elevator car is continuous and rate-limited, and wherein a final velocity of the elevator car is a desired rescue velocity.

13. The method according to claim 1, wherein if an elevator positioning system indicates that a position of the elevator car is at an edge of a door zone area, power is drawn from the battery to generate braking torque in the electric motor of the hoisting machine.

14. The method according to claim 1, wherein in the second rescue run, to reduce an acceleration of the elevator car after the hoisting machinery brakes are open, windings of the electric motor of the hoisting machine are shorted to apply dynamic braking to the electric motor of the hoisting machine.

15. The method according to claim 1, wherein the rescue drive device determines a velocity of the elevator car by means of a motor encoder, and starts regenerative braking by initiating modulation of power transistors of an inverter of the electric motor of the hoisting machine when the velocity of the elevator car exceeds a predetermined threshold value.

16. The method according to claim 15, wherein for a period of the regenerative braking of the electric motor of the hoisting machine, the rescue drive device operates a speed control loop of the elevator car such that movement of the elevator car proceeds according to a predetermined speed profile towards a landing.

17. The method according to claim 1, wherein at the end of the second rescue run, a distance of the elevator car to a landing is measured, and wherein a brake dropping command is generated when the measured distance is less than a predetermined brake dropping limit.

18. The method according to claim 1, wherein in the second rescue run, a rotor pole position of the electric motor of the hoisting machine is resolved from operating parameters of the rotating electric motor during the dynamic braking of the electric motor.

19. The method according to claim 1, wherein the hoisting machinery brakes are opened by supplying pick power from the battery to the brakes one-by-one, and wherein after opening a brake, a power supply to the brake is reduced to a predefined level required to hold the brake open.

20. A system for an automatic rescue operation of an elevator car in an elevator system, said elevator system comprising a hoisting machine and a battery-operated rescue drive device configured to provide power signals to the hoisting machine and/or hoisting machinery brakes, wherein a load sensor is configured to gather elevator car load information, and the rescue drive device is configured to select, based on the elevator car load information, a first rescue run or a second rescue run, wherein said first rescue run comprises supplying electrical power from a battery of the rescue drive device to an electric motor of the hoisting machine and/or hoisting machinery brakes to initiate movement of the elevator car, wherein said second rescue run comprises shorting windings of the electric motor of the hoisting machine to apply dynamic braking of the electric motor, wherein the battery-operated rescue drive device is configured to select the first rescue run if the elevator car load is within a first range of a rated load of the elevator car, and wherein the battery-operated rescue drive device is configured to select the second rescue run if the elevator car load is within a second range of the rated load of the elevator car.

* * * * *